July 27, 1937. F. L. VERCH 2,088,182
AUXILIARY THROTTLE CONTROL
Filed Nov. 11, 1935

INVENTOR
FREDERICK L. VERCH
BY R. V. Craddock
ATTORNEY

Patented July 27, 1937

2,088,182

UNITED STATES PATENT OFFICE 2,088,182

AUXILIARY THROTTLE CONTROL

Frederick L. Verch, Albany, N. Y.

Application November 11, 1935, Serial No. 49,151

6 Claims. (Cl. 74—562)

My invention more particularly relates to a device which is adapted to be attached to the accelerator pedal of a motor vehicle and, which in effect, forms an extension thereof to a point which is more advantageous or desirable to the operator of the vehicle.

One of the most difficult operations involved in automobile driving is that of accelerating the motor to start up the car while the foot brake is being released. The necessity for so doing arises when the vehicle, for example, has been stopped and is being held upon an incline. In this case, a driver may use the emergency brake instead of the foot brake so that the accelerator pedal may be used, or, he may use the brake pedal and control the motor by a hand throttle. When neither the emergency brake or a hand throttle is used, it is difficult to release the foot brake and start the car by accelerating the motor without permitting the vehicle to roll backwards. During this operation, of course, the left foot is being used on the clutch pedal and the right foot must be taken quickly from the brake pedal as the brake is released and applied to the foot accelerator. The emergency brake is usually placed in such a position that it is difficult for the driver to release and at the same time properly operate the car.

In the older types of vehicles a hand throttle was provided which could be used to speed up the motor as the brake was released by the right foot and the clutch was let in by the left foot. However, in the later types of cars, the hand throttle has been eliminated, at least so far as the disposition thereof upon or near the steering wheel is concerned. In some cases a button is provided on the dash board whereby the operator may control the motor speed; but this arrangement proves satisfactory only in starting the motor or when the operator can give substantially his undivided attention to this adjustment. It is almost impossible to use a hand throttle control of this character under traffic driving conditions.

Hence, in view of the foregoing, my invention has for an object the provision of a device which may readily be attached to the usual accelerator pedal of an automobile to effect an extension thereof to a desired point and which due to its preferred disposition relative to the brake pedal thereof may be actuated by the right foot of the operator while he is using the same foot to control the brakes.

My invention has for a further object the provision of a device or attachment of the foregoing character which is very simple and cheap to manufacture and which may easily and quickly be attached to or detached from an accelerator pedal.

A further object resides in the provision of a pivotal connection of such a character between the accelerator pedal and the arm of my device that when it is not desired it may be swung to a position out of the operator's way.

A still further object of my invention resides in the provision of an accelerator attachment which is of such construction that it may be deformed or altered to suit the requirement of the individual user.

With these and other objects in view, my invention includes the novel elements and the combinations and arrangements thereof described below and illustrated in the accompanying drawing in which—

Most drivers become accustomed to using the foot accelerator almost entirely in operating their automobile and develop a fairly high degree of skill in starting the car from a standstill and effecting a uniform acceleration. But this skill is usually found wanting under emergency conditions. For example, when he attempts to use a hand throttle because of his inability to use the foot accelerator, he is very apt to stall the motor or start off very suddenly. It is evident, therefore, that when, for example, a vehicle is held at a standstill upon an incline and traffic is rather congested, the inability to use a hand throttle, the inaccessibility of the emergency brake or, as in late models, the absence of a hand throttle all contribute to cause minor mishaps and generally aggravate traffic conditions. Furthermore, the operations of releasing the brakes, letting in the clutch and accelerating the motor are, under the above conditions, important ones and must be properly coordinated in order to effect the correct operation of an automobile.

In order to facilitate driving generally and particularly to obviate the necessity of using either of the means above referred to, that is, a hand brake or hand throttle, in starting a vehicle, for example, on an incline, I have, in my present invention, provided means whereby the same results may be easily accomplished.

It should also be noted that in those cases where the emergency brake or the hand throttle is used, the operator who is proficient with one model or make of automobile must in most cases adapt himself to other makes or models. In other words, it is necessary when using a different make of car or even a later model to reacquire one's skill in starting cars under adverse conditions, such as above indicated. In my device, I have provided means whereby an operator may drive one make of car with substantially the same proficiency as any other make, particularly when using the foot brake and accelerating the motor.

Figure 4:
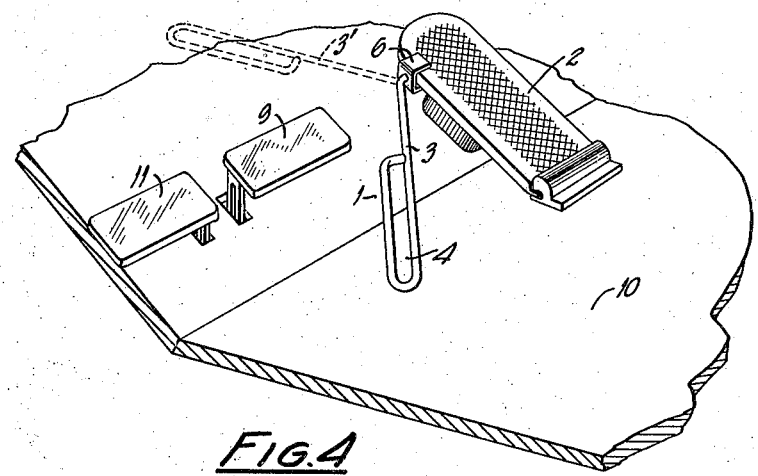
Fig. 4 is a fragmentary perspective view illustrating a portion of the flooring of a motor vehicle and an accelerator pedal having my device attached thereto.
Figure 1:
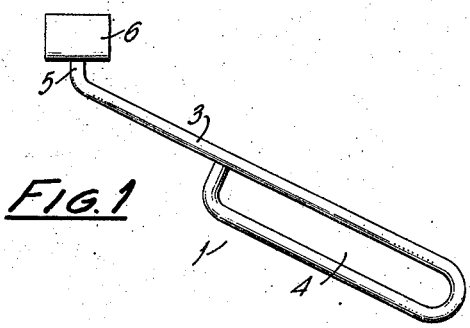
Fig. 1 is a plan view of my device.
Figure 3:
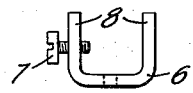
Fig. 3 is an end view of the clamp.
Figure 2:
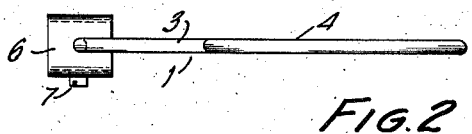
Fig. 2 is an elevation view thereof.

Referring to the drawing, 1 indicates generally my auxiliary throttle control which is adapted to be attached to the foot accelerator pedal 2, as shown in Fig. 4. My device comprises an arm 3 which may be of any desired configuration but which, in the embodiment illustrated, comprises an element which is bent back upon itself in spaced relationship to form the portion indicated at 4 which is adapted to be engaged by the foot of the operator. The design of the member 3, illustrated, affords a very cheap and simple arm or lever which, if desired, may be altered somewhat in accordance with the desires of the user. The end of the arm 3 opposite the end portion indicated at 4 is bent over as at 5 and angularly disposed relative to the main portion of the arm 3 and is adapted to be pivotally supported in a clamping member 6. The member 6 is preferably U-shaped and provided with a set screw 7 which is threaded through an opening in one of the spaced jaws 8 thereof. It will be noted that the end portion 5 of the arm 3 is disposed at an obtuse angle with respect to the main portion of arm 3. This construction is provided in order that the arm 3 may extend diagonally from the accelerator and pass in front of the brake pedal 9 as illustrated in Fig. 4. The end of the arm 3 is freely supported so far as any mechanical supporting means is concerned and is adapted to rest upon the surface of the floor 10 of the vehicle with which my device is being used.

Figure 5:
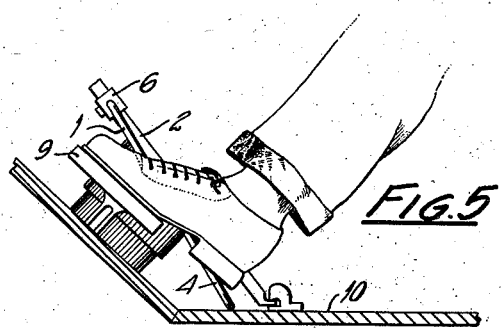
Fig. 5 is a fragmentary elevation view illustrating the relative disposition of the brake pedal and my device and showing the manner in which the two may be simultaneously operated.

It will be noted that the ordinary actuation of an accelerator by the foot of the operator of a vehicle is in no way affected by the attachment thereto of my device. Furthermore, the attachment of a device of the character herein disclosed, in addition, affords a wider latitude to the operator in the control of the motor speed than the accelerator alone. For example, it may be necessary to stop the automobile on a steep grade. The operator throws out the clutch by pressing upon the clutch pedal 11 with his left foot and applies the brakes by actuating brake pedal 9 with his right foot. In order to start the car and effect a uniform acceleration thereof, he must let in the clutch, release the brakes and increase the motor speed in proper timed relationship. With my device, this is accomplished as shown in Fig. 5. That is, with the toe of the right foot slowly diminishing the pressure applied to brake pedal 9, the heel of the right foot engages the portion 4 of arm 3 and depresses the same thereby accelerating at the will of the operator the speed of the motor. It will be noted, of course, that due to the simple construction of my device the arm 3 is pivoted about its free end which rests upon the floor surface when pressure is applied at a point intermediate the length thereof as hereinbefore indicated.

My device is also adapted to form substantially an extension member for the foot accelerator pedal. There are many instances where the foot accelerator is spaced at too great a distance for a driver with short legs to reach comfortably. My device is of such construction that it may be adjusted relative to the foot accelerator to suit the desires of the operator. Hence, the arm 3 may be placed in a position where a driver may reach it with much greater ease than he could the accelerator which, of course, as a factory installed accessary, is not movable or adjustable. The driver, therefore, may use my device for ordinary driving purposes and eliminate the strain caused by driving for comparatively long distances in an unnatural posture.

It should also be noted that in view of the pivotal construction between the arm 3 and clamping member 6, arm 3 may be rotated about its end portion 5 and through approximately 180 degrees to the position, indicated in dotted lines at 3', where it is entirely out of the way of the operator.

While I have described my invention in its preferred embodiment, it is to be understood that the words which I have used are words of description and not of limitation and, hence, changes within the purview of the appended claims may be made without departing from the true scope and spirit of my invention in its broader aspects.

What I claim is:

1. In a device of the character described for controlling an operation of an accelerator pedal, means forming a clamp adapted to be attached to said pedal and an arm pivotally connected at one end to said clamping means and extending obliquely relative to its pivotal axis, the other end of said arm being free and adapted to rest upon the floor surface adjacent said accelerator.

2. In a device of the character described for controlling an operation of an accelerator pedal, means forming a clamp adapted to be attached to said pedal and an arm, one end thereof being pivotally connected to said clamping means and the other end being free to rest and pivot upon the floor surface adjacent said accelerator whereby said arm may be pivoted about its free end to actuate the accelerator pedal and freely rotated on its pivotal connection to an alternative position when not in use.

3. In a device for use with a vehicle having a brake pedal and accelerator pedal disposed in spaced relationship, an arm and means for pivotally connecting said arm to said accelerator pedal; said arm extending obliquely relative to its pivotal axis and being of sufficient length to pass in front of said brake pedal, whereby said brake pedal and arm may be simultaneously actuated.

4. In a device for use with a vehicle having a brake pedal and accelerator pedal disposed in spaced relationship, an arm and means for pivotally connecting one end of said arm to said accelerator pedal; said arm extending obliquely relative to its pivotal axis and being of sufficient length to pass in front of said brake pedal and having the end thereof, remote from said pivotally connected end, freely supported on the flooring of said vehicle whereby said arm may be pivoted about its free end to actuate said accelerator pedal.

5. In a device of the character described, the combination with an accelerator and brake pedal disposed to extend in spaced relationship above the floor of a vehicle of an arm and means for securing said arm in laterally extending relation to said accelerator pedal; said means being adapted to effect an operative positioning of said arm relative to said brake pedal and to permit an end of said arm freely to rest and pivot upon the floor surface above which said pedals extend.

6. In a device of the character described, the combination with an accelerator pedal of an arm pivoted at one end to said accelerator and extending laterally and obliquely therefrom; the other end of said arm being free to rest and pivot upon the floor surface above which said accelerator extends whereby a downward pressure applied to said arm effects a depression of said accelerator pedal.

FREDERICK L. VERCH.